United States Patent [19]

Erickson, Jr.

[11] Patent Number: 4,829,232
[45] Date of Patent: May 9, 1989

[54] NONLINEAR RESONANT SWITCH AND CONVERTER

[75] Inventor: Robert W. Erickson, Jr., Boulder, Colo.

[73] Assignee: General Motors Corporation, Detroit, Mich.

[21] Appl. No.: 239,812

[22] Filed: Sep. 2, 1988

[51] Int. Cl.$^4$ .............................................. G05F 1/46
[52] U.S. Cl. ................................. 323/290; 323/222; 323/282
[58] Field of Search .............. 323/222, 282, 283, 284, 323/285, 286, 287, 288, 290

[56] References Cited

U.S. PATENT DOCUMENTS

| | | | |
|---|---|---|---|
| 3,663,949 | 5/1972 | Froeschle | 323/290 |
| 4,187,458 | 2/1980 | Milberger et al. | 323/290 |
| 4,415,959 | 11/1983 | Vinciarelli | 363/21 |
| 4,415,962 | 11/1983 | Kassakian | 323/222 |
| 4,575,672 | 3/1986 | Deprez et al. | 323/222 |
| 4,591,966 | 5/1986 | Smith | 323/290 |

OTHER PUBLICATIONS

Liu et al., "Resonant Switches-Topologies and Characteristics", IEEE Power Electronics Specialist's Conference, Jun. '85, pp. 106-116.

Ngo, "Generalization of Resonant Switches and Quasi-Resonant DC-DC Converters", IEEE Power Electronics Specialist's Conf., Jun. '87, pp. 395-403.

Primary Examiner—Peter S. Wong
Attorney, Agent, or Firm—Mark A. Navarre

[57] ABSTRACT

A nonlinear resonant switch for power conversion devices and a converter using the switch are described. The switch optimizes converter efficiency by switching only when current is zero and by limiting the peak current to a value near that provided by conventional PWM converters. A nonlinear reactor having a winding in series with the switch and a tank circuit is biased to saturation at low currents but is driven into an unsaturated condition by high currents so that a resultant high series inductance mitigates further current increase. Several converter topologies incorporating this improvement are shown.

11 Claims, 4 Drawing Sheets

NONLINEAR RESONANT SWITCH AND CONVERTER

FIELD OF THE INVENTION

This invention relates to resonant switches and particularly to nonlinear resonant switches useful in power conversion devices and to converters using such switches.

BACKGROUND OF THE INVENTION

In the power conversion field, there is a trend toward the increase of converter operating frequencies, with the objective of reducing converter size, weight and cost. Increase of the switching frequency allows significant reductions in the size of converter transformers and reactive filter components.

Traditional pulse width modulation converters use transistor switching to terminate current flow at the end of each pulse. Transistor switching loss, which increases linearly with switching frequency, is a major impediment to the increase of switching frequency. Transformer nonidealities, such as leakage inductance and winding capacitance, also become more significant at higher frequencies and can further degrade converter efficiency.

Recent work on resonant switch converters has attempted to eliminate some or all of these sources of power loss and thereby attain good efficiency at higher operating frequencies. These classes of converters consist of linear resonant tank elements operated in conjunction with transistor power switches such that their transistors switch on and off at either zero voltage or zero current, and therefore exhibit greatly reduced switching loss. The resonant tank elements also often appear in series or parallel with transformer nonidealities, and therefore transformer leakage inductance and/or winding capacitance does not degrade operation of the converter. It may be possible to increase the converter operating frequency by one or two orders of magnitude using these techniques.

The U.S. Pat. No. 4,415,959 to Vinciarelli discloses a DC-to-DC converter with a switching device connected in series with a source of energy and an LC circuit effecting current pulses through the switch. A control circuit turns the switch on and off when the current is zero, thus eliminating switching losses.

The paper by Liu and Lee, "Resonant Switches—Topologies and Characteristics," IEEE Power Electronics Specialists Conference, 1985 Record, pp. 106-116, discusses half-wave and full-wave configurations of resonant switches and their application to converter circuits of various kinds including buck, boost, and buck/boost resonant switch converters.

The paper by Ngo, "Generalization of Resonant Switches and Quasi-Resonant DC-DC Converters," IEEE Electronics Specialists Conference, 1987, pp. 395-403, further discusses and analyzes the resonant switches as applied to converters.

It is generally recognized that pulse-width-modulated (PWM) converters of various kinds can be adapted to resonant switch operation to achieve zero current switching and therefore realize no switching losses. On the other hand, previously proposed resonant switch converters have the disadvantage that, for the same output current and power, resonant quasi-sinusoidal waveforms exhibit higher peak values than do the rectangular waveforms of conventional pulse-width-modulated converters. Consequently, resonant switch converters exhibit higher conduction losses in the transistor and these increased conduction losses can partially or wholly negate the gains made by the elimination of switching losses. Even though power FET's have desirable characteristics for switching in power conversion devices, they do have significant resistance. Thus it is important to minimize the peak current to minimize the losses.

SUMMARY OF THE INVENTION

It is therefore an object of the invention to provide a switch useful for power conversion which eliminates switching losses while preserving the low peak current of conventional PWM devices and a converter using such a switch.

The invention is carried out by a nonlinear resonant switch comprising; a nonlinear reactor having a magnetic core with a primary winding and a secondary winding on the core, means for saturating the core at low primary winding currents and permitting unsaturation at high primary winding currents, a primary circuit comprising a semiconductor switch means serially connected with a resonant tank circuit, the tank circuit including the said primary winding and a capacitor, whereby the peak tank circuit current is attenuated by the inductance of the nonlinear reactor in its unsaturated condition, means for timing the switching of the switch means with respect to the tank resonance to switch when current through the switch means is zero, thereby optimizing switching efficiency, a diode combined with the capacitor in parallel, and a secondary circuit comprising the diode and capacitor combination in series with the secondary winding.

The invention is further carried out by a converter utilizing a nonlinear resonant switch.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The nonlinear resonant switch described here combines the zero current switching of previous resonant switch schemes with the low peak currents of conventional pulse-width-modulated converters. A nonlinear tank circuit is devised with ringing current distorted such that the peak value is reduced. Transistor switching still occurs at zero current but the peak current need only be 10% to 20% greater than that of the conventional PWM converter. Such a waveform can be obtained by use of a controlled saturation inductor. The nonlinear resonant concept is quite general and can be applied to a wide variety of resonant and quasi-resonant linear topologies.

Figure 1:
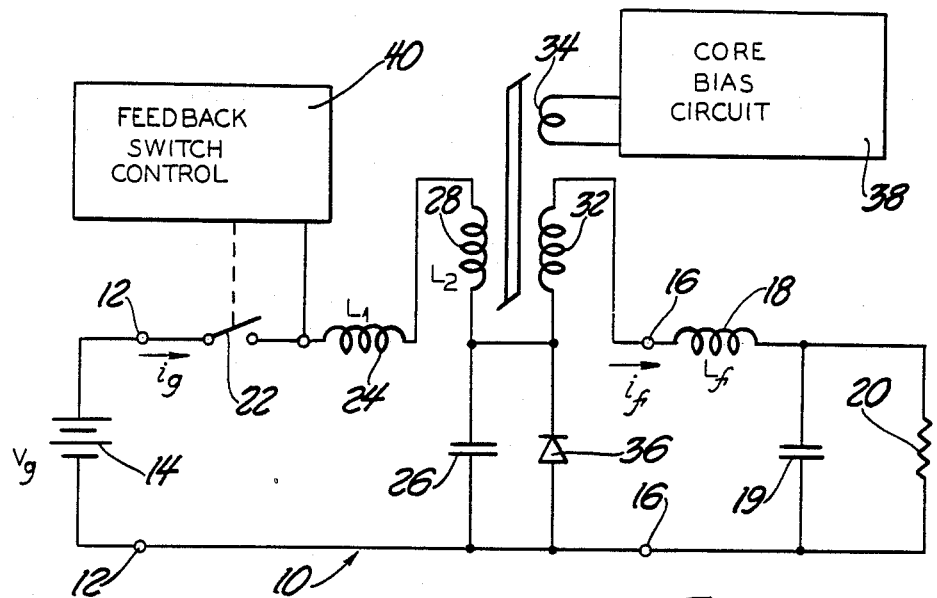
FIG. 1 is a schematic circuit diagram of a generalized nonlinear resonant switch in a converter according to the invention.

FIG. 1 depicts a general case of a resonant nonlinear switch 10 as applied to a buck converter configuration. Input terminals 12 are connected across a voltage supply 14 and output terminals 16 are connected to an LC filter, comprising inductor 18 and capacitor 19 and a load 20. A switch element 22 arranged for either half-wave or full-wave operation is connected in series with linear tank elements, inductance $L_1$ (or 24) and capacitance C (or 26), and a nonlinear inductance $L_2$ (or 28). The nonlinear inductance comprises a primary winding 28 on a magnetic core 30 having a secondary winding 32 and a turns ratio N. The turns ratio generally determines the value of the peak current. The secondary winding is coupled at one end to one output terminal 16 and at the other end through a diode 36 to the other terminal 16. The diode 36 is also in parallel with the capacitance 26. Optionally, an auxiliary winding 34 is included to bias the core toward saturation.

Figure 3:
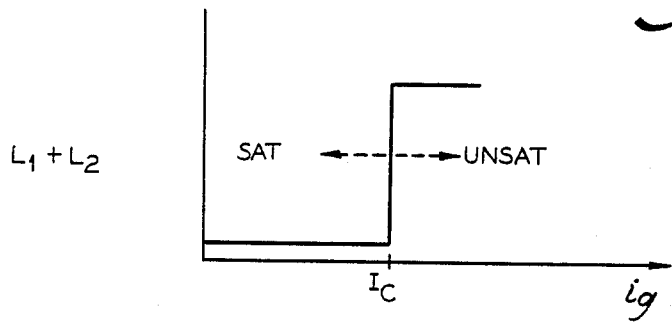
FIG. 3 is a diagram illustrating circuit inductance versus switch current for an idealized case of the circuit of FIG. 1.
Figure 2:
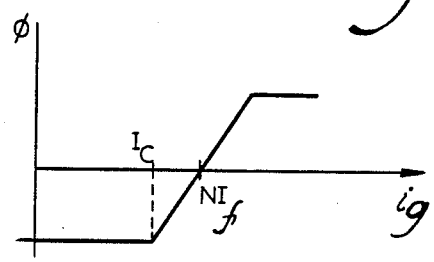
FIG. 2 is a diagram illustrating core flux versus current in a reactor used in the circuit of FIG. 1.

In the case where the auxiliary winding 34 is employed, the saturation of the core 30 is determined by the core bias circuit 38 and the current in the secondary winding 32. The bias circuit 38 provides a constant DC current to the winding 34 sufficient, in combination with the secondary winding current, to bias the core to saturation in the presence of small primary winding currents. The bias is overcome, however, by large primary currents which produce flux opposing that of the bias and secondary winding currents to drive the core into unsaturated condition. This is illustrated in FIG. 2 which is a graph of the core flux vs. primary current for an idealized core. The flux is constant until the current reaches a critical value $I_c$ indicating core saturation. Then the flux changes with current above $I_c$ indicating operation in the linear or unsaturated region. The effect of this changing core property on the inductance $L_2$ is illustrated in FIG. 3 which graphs the total tank inductance against the tank current for an idealized core. The circuit is designed with the inductance $L_2$ (unsaturated) much larger than the combined inductance $L_1$ and inductance $L_2$ (saturated). Thus the combined inductance increases dramatically when the secondary current passes the critical value $I_c$. In practice the inductance may increase, for example, by a factor of one hundred to one thousand. The linear inductor $L_1$ may also be omitted; the tank inductance for small primary current is then the saturated value of $L_2$.

The core bias circuit 38 and auxiliary winding 34 are not essential to the core saturation scheme. Another way to achieve the desired core saturation characteristics described above is to control the current in the secondary winding ($I_f$) to a substantially constant value to provide the desired degree of saturation. When used in conjunction with a converter, the output filter stage has a large inductance 18 in series with the secondary winding 32 which maintains the secondary current at a stable amplitude. When the inductor $L_2$ is biased by the output current $I_f$ such that it is saturated at low current but is not saturated at high current (in the vicinity of $NI_f$), this has the effect of limiting the peak tank current to approximately N times $I_f$. The turns ratio N is chosen to be slightly greater than unity so that the peak switch current is only slightly greater than in the conventional PWM switched mode case. $L_1$ is chosen to limit the rate of rise of switch current to a level which yields acceptably low switching losses. Thus, either core bias arrangement is applicable to the various converter topologies incorporating the nonlinear resonant switch.

Figure 4:
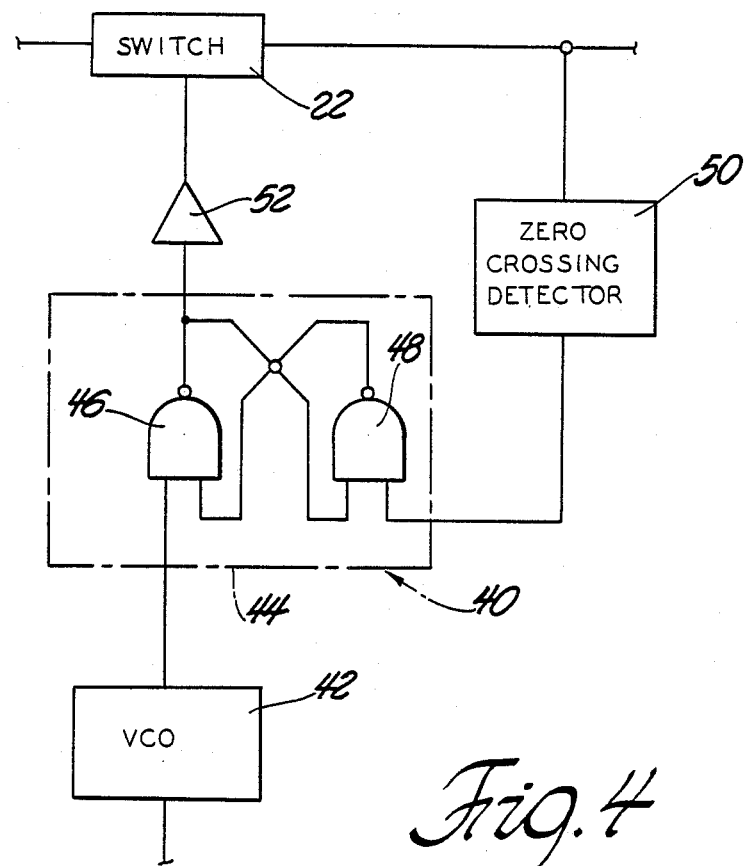
FIG. 4 is a schematic circuit diagram of a feedback switch control for the circuit of FIG. 1.

The operation of the switch element 22 is determined by the feedback switch control 40 which is coupled to the tank circuit to sense the current flowing through the switch element 22. As best shown in FIG. 4, the control 40 includes a VCO 42 for setting a switching frequency, a latch 44 comprising a pair of cross coupled NAND gates 46 and 48, a zero crossing detector 50 sensing the tank current to provide a signal when the current is zero, and a transistor driver 52 to turn the switch element 22 on and off. The VCO 42 is connected to an input of gate 46 (the set input) and the zero crossing detector 50 is connected to an input of gate 48 (the reset input). The output voltages of the VCO 42 and the detector 50 are normally high and momentarily go low to set or reset the latch 44. Thus, the switch element 22, which normally comprises a transistor coupled to a diode, is turned on by the VCO signal and turned off by the zero crossing detector signal. In each event, the current through the switch is zero. The VCO frequency must be set low enough by a control voltage input to assure that the tank current returns to zero prior to turning the switch on. In the case of a half-wave converter a single pulse of tank current is allowed before turning the switch off. For a full-wave converter, two or more pulses are passed for each switch on period.

Figure 5:
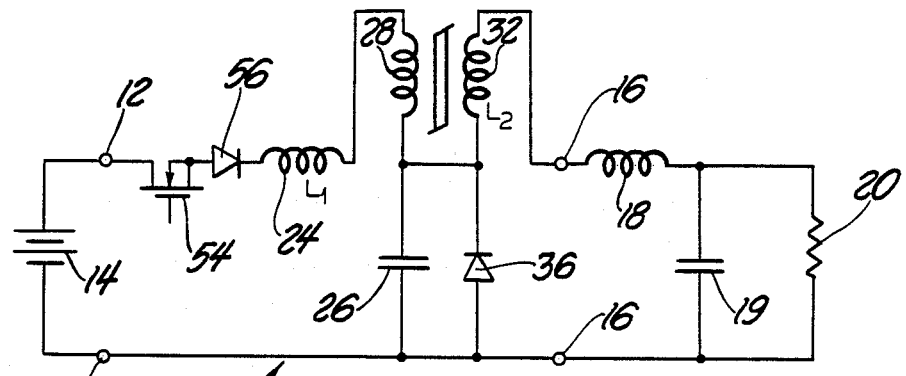
FIG. 5 is a schematic circuit of a half-wave buck-type nonlinear resonant switch converter according to the invention.
Figure 6:
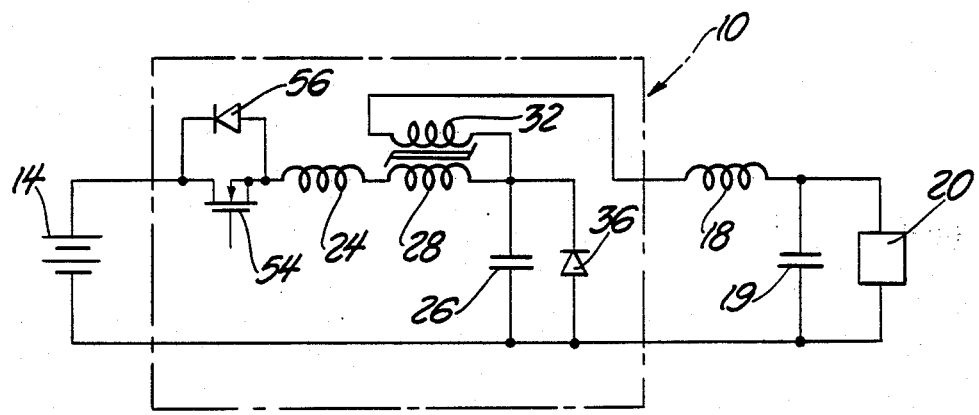
FIG. 6 is a schematic circuit of a full-wave buck-type nonlinear resonant switch converter according to the invention.

The switch element for a half-wave buck converter, as shown in FIG. 5, is a power FET 54 in series with a diode 56. The full-wave buck converter circuit, shown in FIG. 6, uses a power FET 54 with a counter parallel diode 56 to allow conduction in the direction opposite to the transistor current. In each case, the core bias circuit 38 and the feedback switch control 40 are assumed, though not shown.

Figure 7A:
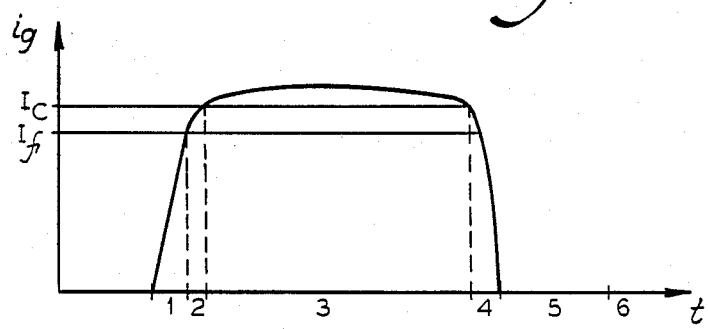
FIGS. 7a and 7b are diagrams of switch current and tank capacitor voltage, respectively, versus time.
Figure 7B:
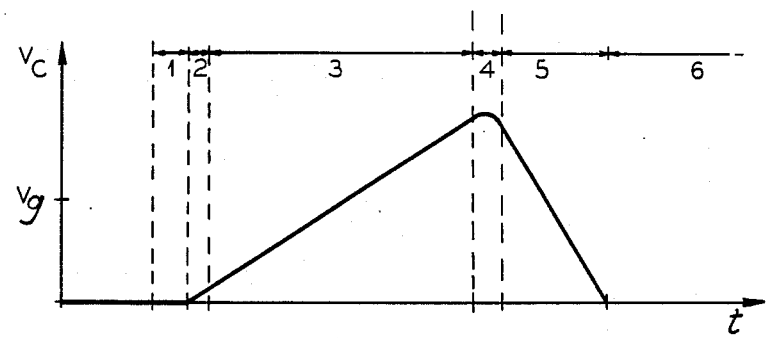

The operation of the half-wave nonlinear resonant switch of FIG. 5 is illustrated by the waveforms of FIGS. 7a and 7b which depict switch current $i_g$ and tank capacitor 26 voltage $v_c$, respectively. The time scale is divided into six intervals 1-6 and the switch operation is illustrated in the following table for each interval. The table shows which elements among the FET 54, the diode 56 and the diode 36 are conducting in each period. In addition, the core saturation state is shown by S or U to indicate saturation or unsaturation, respectively.

| Interval | 1 | 2 | 3 | 4 | 5 | 6 |
|---|---|---|---|---|---|---|
| FET 54 | X | X | X | X | | |
| Diode 56 | X | X | X | X | | |
| Diode 36 | X | | | | | X |
| Core | S | S | U | S | S | S |

During interval 1, the FET has just switched on and the switch current increases at a rate limited by the total saturated tank inductance while the capacitor voltage remains at zero since the diode 36 is conducting. In the interval 2 the diode 36 becomes backbiased and the capacitor voltage begins to increase. The switch current increases at a progressively lower rate since the voltage across the inductors $L_1$ and $L_2$ is decreasing. Thus far the core has been saturated. At the beginning of interval 3, the switch current reaches the critical level Ic where it is sufficient to overcome the core bias and the core becomes unsaturated. The very high inductance of the tank circuit during this period prevents rapid current changes so that the switch current waveform has a gently rounded top rather than a high sinusoidal peak typical of a tank circuit oscillation. The capacitor steadily charges during this period. As the current decreases and reaches the critical value, the core again saturates at the beginning of the interval 4 and the low inductance allows the switch current to decrease rapidly to zero. Then during interval 5, the capacitor discharges to zero volts and during interval 6, the diode conducts to accommodate the output current maintained by the filter inductor 18.

An example of a specific converter utilizing the half-wave nonlinear resonant switch according to the FIG. 5 design, comprises capacitance 36 of 0.047 microfarad, inductance $L_1 = 10$ microhenries, $L_2$ (unsaturated) = 6.25 millihenries, $L_2$ (saturated) = 8.8 microhenries and filter inductance 18 = 750 microhenries. The inductor $L_2$ was wound on a Magnetics Inc. 1408-G material ungapped ferrite pot core, with 12 turns #24 AWG primary and 15 turns #26 AWG secondary for a turns ratio N of 1.25. The inductor 24 consisted of 6 turns of #20 AWG copper wire on a Magnetics, Inc. 1408-G pot core with a 6 mil air gap. For input voltage of 24.3 volts, measured values were filter output voltage = 17.9 volts, output current = 0.71 amps, peak switch current = 0.92 amps and switching frequency = 44.12 kHz. Thus, the zero current switching at both turn on and turn off is obtained and the peak transistor current is approximately 25% greater the output current. This contrasts with a peak current of 1.925 amps which would occur in an equivalent linear resonant switch converter.

Figure 8:
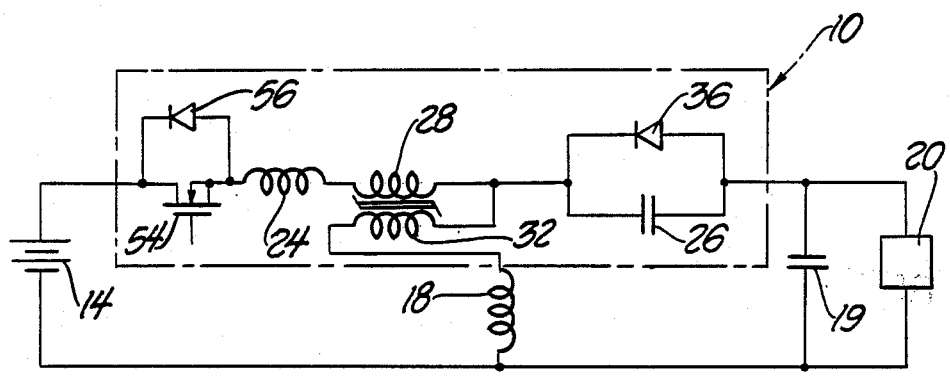
FIG. 8 is a schematic circuit of a full-wave buck-boost nonlinear resonant switch converter according to the invention.

FIG. 8 is a schematic diagram of a buck-boost nonlinear resonant switch converter. The switch configuration is the same as for FIG. 6. The converter circuit differences are that the filter inductor 18 is connected to the negative side of the battery 14 and the tank circuit is connected to the positive side of the load 20 and filter capacitor 19. The primary loop includes the battery 14, switch 54, 56, inductor 24, primary winding 28, the tank circuit 26, 36 and the filter capacitor 19 and load 20. The secondary loop comprises the filter inductor 18, the secondary winding 32 the tank circuit 26, 36 and the filter capacitor 19 and load 20.

Figure 9:
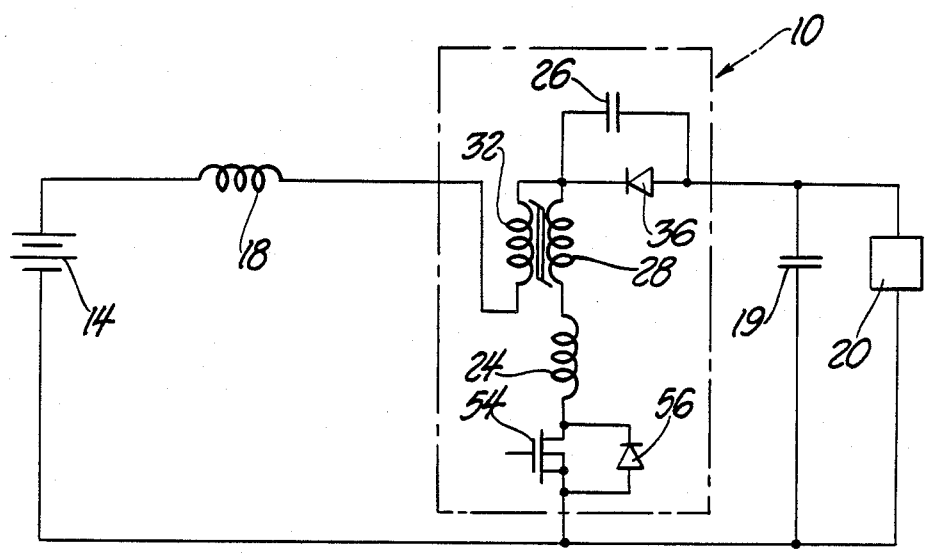
FIG. 9 is a schematic circuit of a full-wave boost-type nonlinear resonant switch converter according to the invention.

FIG. 9 shows the circuit for a boost-type nonlinear resonant switch converter. There the filter inductor 18 is serially connected between the battery 14 and the secondary winding 32. The secondary loop comprises the battery 14, the filter inductor 18, the secondary winding 32 the tank circuit 26, 36, and the filter capacitor 19 and load 20. The primary loop includes the switch 54, 56, inductor 24, primary winding 28, the tank circuit 26, 36 and the filter capacitor 19 and load 20.

All the converters disclosed herein, have in common a nonlinear resonant switch wherein the nonlinear element is an inductor biased to saturation for low switch currents and to nonsaturation for high switch currents. In each case, the primary loop of the converter includes the primary winding of the reactor in series with an FET, a tank circuit and an energy device comprising either the battery or a capacitor, or both. The secondary loop includes the secondary winding in series with a filter inductance and one of the energy devices. Both loops share the tank capacitor which is in parallel with a diode. In each case the switch is controlled to switch on and off when the tank current is zero and the reactor core bias is controlled by the secondary winding or by a bias circuit and a separate winding.

There are hundreds of known PWM converter circuits, of which only three of the most simple (buck, boost and buck-boost) are discussed above. One of the important concepts of the resonant switch (linear or nonlinear) is that a resonant switch converter can be generated from a known PWM converter by the addition of a few tank components and diodes. For the nonlinear resonant switch converter the following is required: (1) insert the nonlinear inductor primary winding effectively in series with the transistor switch, (2) insert a diode effectively in series (half-wave) or counter parallel (full-wave) with the transistor switch, (3) insert the nonlinear inductor secondary winding effectively in series with the filter inductor of the PWM converter, (4) insert a tank capacitor effectively in parallel with the original converter diode, and (5) modify the control circuit to ensure zero current switching. An auxiliary bias circuit may be added. If the PWM converter contains multiple filter inductors, then additional nonlinear inductor secondary windings may be necessary so that the peak switch current is maintained at 10% to 20% greater than that of the original PWM converter.

The embodiments of the invention in which an exclusive property or privilege is claimed are defined as follows:

1. A nonlinear resonant switch comprising;
   a nonlinear reactor having a magnetic core with a primary winding and a secondary winding on the core,
   means for saturating the core at low primary winding currents and permitting unsaturation at high primary winding currents,
   a primary circuit comprising a semiconductor switch means serially connected with a resonant tank circuit, the tank circuit including the said primary winding and a capacitor, whereby the peak tank circuit current is attenuated by the inductance of the nonlinear reactor in its unsaturated condition,
   means for timing the switching of the switch means with respect to the tank resonance to switch when current through the switch means is zero, thereby optimizing switching efficiency,
   a diode combined with the capacitor in parallel, and
   a secondary circuit comprising the diode and capacitor combination in series with the secondary winding.

2. The invention as defined in claim 1 wherein the core saturating means comprises the secondary winding and means for maintaining a substantially constant secondary current at a level sufficient to establish core saturation for primary currents substantially below a desired peak value.

3. The invention as defined in claim 2 wherein the core saturating means includes an auxiliary winding and means for supplying a substantially constant bias current at a level sufficient to establish core saturation for primary currents substantially below a desired peak value.

4. The invention as defined in claim 1 wherein the semiconductor switch means comprises a field effect transistor in series with a diode poled to block current in the direction opposite to switch conduction for effecting half-wave resonant switch operation.

5. The invention as defined in claim 1 wherein the semiconductor switch means comprises a field effect transistor in parallel with a diode poled to conduct current in the direction opposite to switch conduction for effecting full-wave resonant switch operation.

6. A nonlinear resonant switch comprising;
   a nonlinear reactor having a magnetic core with a primary winding and a secondary winding on the core,
   means for saturating the core at low primary winding currents and for causing unsaturation at high primary winding currents,
   first and second terminal means,
   a primary circuit comprising a semiconductor switch means and a resonant tank circuit including an inductor and a capacitor serially connected with the first terminal means, the said primary winding forming at least a part of the inductor, whereby the peak tank circuit current is attenuated by the inductance of the nonlinear reactor in its unsaturated condition,
   a diode effectively in parallel with the capacitor,
   a secondary circuit comprising the said secondary winding and the said capacitor serially connected to the second terminal means, and
   means for switching the switch means when current through the switch means is zero, thereby optimizing switching efficiency.

7. A nonlinear resonant switch converter comprising;
   a pair of energy devices comprising an input source and an output capacitor,
   a nonlinear reactor having a magnetic core with a primary winding and a secondary winding on the core,
   means for saturating the core at low primary winding currents and for causing unsaturation at high primary winding currents,
   a primary circuit comprising a semiconductor switch means and a resonant tank circuit including an inductor and a tank capacitor serially connected with at least a first one of the said energy devices, the said primary winding forming at least a part of the inductor, whereby the peak tank circuit current is attenuated by the inductance of the nonlinear reactor in its unsaturated condition,
   a diode effectively in parallel with the tank capacitor,
   a secondary circuit comprising the said secondary winding, a filter inductor and the said tank capacitor serially connected to a second one of the energy devices, and
   means for switching the switch means when current through the switch means is zero, thereby optimizing switching efficiency.

8. The invention as defined in claim 7 wherein the core saturating means comprises the secondary winding and means for maintaining a substantially constant secondary current at a level sufficient to establish core saturation for primary currents substantially below a desired peak value.

9. The invention as defined in claim 8 wherein the core saturating means includes an auxiliary winding and means for supplying a substantially constant bias current at a level sufficient to establish core saturation for primary currents substantially below a desired peak value.

10. The invention as defined in claim 7 wherein the semiconductor switch means comprises a field effect transistor in series with a diode poled to block current in the direction opposite to switch conduction for effecting half-wave resonant switch operation.

11. The invention as defined in claim 7 wherein the semiconductor switch means comprises a field effect transistor in parallel with a diode poled to conduct current in the direction opposite to switch conduction for effecting full-wave resonant switch operation.

* * * * *